April 27, 1965 R. A. STOVER 3,180,944

ADJUSTABLE AIR BEARING SUPPORTED MAGNETIC HEAD

Filed April 25, 1961

RICHARD A. STOVER
INVENTOR

BY Sughrue, Rothwell, Mion & Zinn

ATTORNEYS 3,180,944

ADJUSTABLE AIR BEARING SUPPORTED MAGNETIC HEAD

Richard A. Stover, Perkinsville, Vt., assignor to Vermont Research Corporation

Filed Apr. 25, 1961, Ser. No. 105,383
2 Claims. (Cl. 179—100.2)

This invention relates to a magnetic head of the type which rides on a hydrodynamic air bearing which air bearing is created by rapid rotation of a magnetic drum or the like. More particularly, this invention relates to improved means for bringing the head into position only when a hydrodynamic film exists and to a precision adjustment for controlling the force applied to the created air bearing by the head.

Magnetic record media, such as drums and the like, are commonly utilized with cooperating magnetic transducers which ride on a hydrodynamic film of air created by rapid movement of the record medium surface. In such cases, the magnetic transducer head is usually slightly biased toward the surface of the record medium such as a drum, but does not actually touch the surface of the drum when the drum is rotating rapidly enough to create the hydrodynamic film of air on which the head rides. However, when the magnetic drum is not moving at a speed sufficient to create a hydrodynamic film of air on which the head may ride, the head must be moved away from the surface of the drum so that it will not actually contact the drum surface, and cause damage to the drum's surface and head. It is an object of this invention to provide a thermal responsive motor actuator for a magnetic head of this type which will move the head into operative position and load the air bearing only after a drum has reached a speed sufficient to provide a hydrodynamic film of air on which the transducer head may ride; and to further move the head away from the drum before the hydrodynamic film is lost when the drum is stopped or slowed down significantly. Thus, the head is never in contact with the drum whether the drum is rotating at full speed or is stationary and accordingly damage cannot occur to the head and drum surface through mutual contact.

In magnetic heads of the type which ride on a hydrodynamic film of air, it is highly desirable to accurately adjust the loading of the head or the force applied by the head on the air bearing. The force with which the head is biased toward the record surface effects and determines the spacing between the head and the drum surface by determining the thickness of the air film between the drum and the head. Since the head to drum spacing is highly important in magnetic recording, the adjustment of such a spacing by infinitely variable vernier adjustment would be highly desirable. Accordingly, it is the object of this invention to provide such a vernier adjustment to control the force which is applied to the transducer head riding on the air bearing and hence control the head to drum spacing and air bearing in minute increments.

A better understanding of the invention together with further objects and advantages thereof will be further understood from a consideration of the following description taken in connection with the accompanying drawings.

Figure 1:
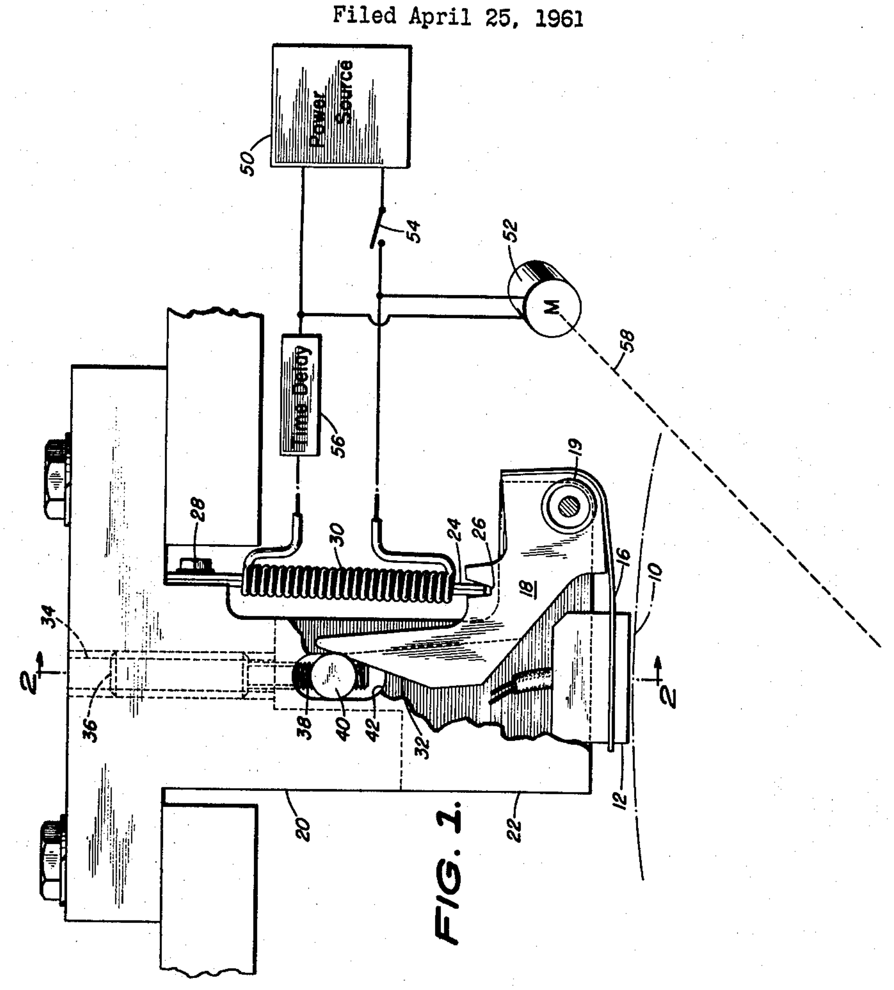
FIG. 1 is a side elevation view of the magnetic head assembly of this invention in its preferred embodiment with a portion broken away for the sake of clarity.
Figure 2:
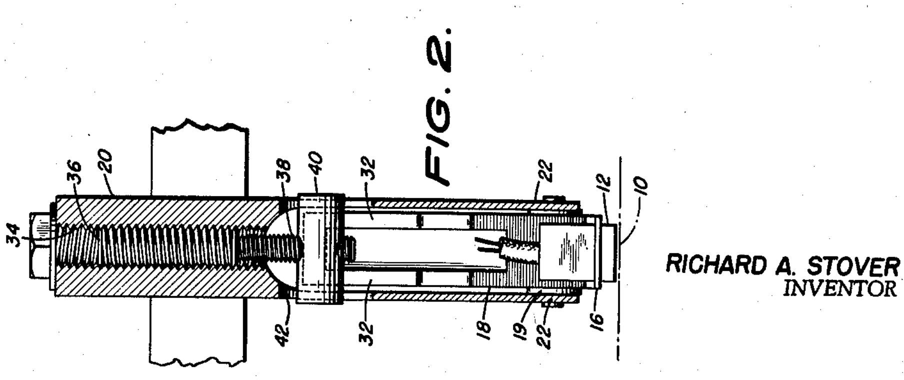
FIG. 2 is an end elevation of the head assembly in FIG. 1 taken along line 2—2 of FIG. 1.

In general, this invention relates to a magnetic transducer head of the type which rides on a hydrodynamic air film created by rapid rotation of a magnetic drum or the like. The transducer head element is supported from a movable support member of a reed spring which functions to bias the head toward the surface of the drum when in operative position to load the air film created by rapid movement of the drum. However, when the drum is not rotating rapidly enough to create the air film a bimetal motor which is responsive to heating from a resistance heating element moves the head support member which in turn moves the head out of operative position and away from the surface of the drum. The movement of the head toward the surface of the drum is adjusted by a vernier adjustment accomplished by a differential screw and nut against which an inclined edge of the movable member may bear. A flat undersurface on the head allows a maximum signal output to be obtained.

Referring specifically to the drawings, a surface 10 of a magnetic recording medium such as a magnetic drum is adapted to contain information thereon in the form of magnetic recording. This information may be placed thereon or read therefrom by a transducer head 12. Rapid movement of the surface 10 causes a thin film of air to adhere thereto and create a laminar fluid film boundary. The head 12 rides on this hydrodynamically created air film so that it is spaced slightly from and does not contact the surface 10. Such an arrangement is known in the art.

The head element 12 may consist of conventional ferrite pole pieces, winding, and air gap and is contained in an insulating body with its underside lapped to a high degree of flatness to provide a plane surface for riding on the air bearing. Suitable electrical connections are provided for the winding. The head element is rigidly mounted to a flexible reed spring 16 and this flexible reed spring is also rigidly connected to a pivotable head support member 18. The reed spring 16 has flexural characteristics and is utilized to provide the loading or biasing force of the head 12 on the hydrodynamically created air film. As is well known, a reed spring such as spring 16 is rigid in the plane of its surface and this allows the head to stay aligned with a track on the drum and to maintain its azimuth position in relation to the track. The pivotable head support 18 is mounted to pivot in preloaded anti-friction bearings 19 of split depending sides 22 of a mount 20. With such an arrangement, the head support member 18 may pivot in its pivot bearings 19 to move the head 12 into and out of operative position riding on the hydrodynamically created film of air.

For causing the head support member 18 and hence the head to move into and out of operative position, without ever contacting the surface 10, a bimetal motor 24 is provided. Bimetallic element 24 is rigidly connected to mount 20 by screw 28 and the other end thereof extends into a notch 26 in head support member 18. A resistance coil 30 may be wound around the element 24 or positioned adjacent thereto and upon applying electrical power to this resistance element, the bimetallic element 24 is heated to a degree where it flexes causing it to drive the head support member 18 about its pivot 19 to the position shown in FIG. 1. When power is removed from resistance coil 30, the bimetallic element 24 cools off and flexes back to a retracted position, thus moving the head 12 away from the recording surface 10.

For limiting the movement of the head 12 toward the surface of the drum and controlling the amount of loading force applied to the head 12 by reed spring 16, a fine screw adjustment means is provided. This fine screw adjustment means includes a threaded hole 34 in the mount 20 which carries a threaded adjustment screw 36 having a reduced diameter lower portion 38 which screw threads which are different in pitch from the threads on the upper portion of the screw to create a differential thread pitch for fine adjustment. A nut member 40 is positioned on the reduced diameter portion 38 of screw 36 and this nut member extends through holes 42 in the mount sides 22. An inclined edge 32 of pivotable head support member 18 contacts the nut 40 to limit the pivotable movement of member 18.

The fine adjustment of screw 36 and the differential effect of the threads together with the position that the nut 40 abuts inclined edge 32 of the pivotable member 18 provides an extremely sensitive adjustment for stopping the pivotable movement of member 18 and causing the flexible reed spring 16 to very accurately load the head 12 on the air bearing. After adjustment, the nut 40 serves as a limit stop for repetitive cycles of actuation of the bimetal motor and the loading of the magnetic head by the reed spring.

A power source 50 for the coil 30 which heats the bimetallic element 24 is connected in the circuit with a drive motor 52 for driving the drum having surface 10 through connection 58. It is evident that when the power to the drive motor is cut off, for example, by switch 54, the heating element 30 no longer heats the bimetal. When the drive power is turned on, a suitable time delay 56 is provided allowing the recording surface 10 to attain a required speed for creating the hydrodynamic air film and then the resistance winding of the bimetal is energized.

In operation, the drum drive power is turned on and the drum rotates, accordingly rotating recording surface 10, until it has attained a required speed, at which speed the hydrodynamic air film is created. A suitable time after the drum drive power is turned on, the resistance coil 30 is energized, heating the bimetal 24 and causing the flexing bimetal to rotate the head support member 18 from an inoperative position with the head 12 away from the recording surface 10 to the full line position shown in FIG. 1. The bimetal motor element 24 moves the head support member 18 until the inclined surface 32 contacts adjustment nut 40. At this time, the reed spring 16 is applying a biasing force to the head 12 and this downward biasing force is equal to the support of the hydrodynamic air bearing and at the point these forces are matched, the head 12 will ride on the air bearing while spaced a very small distance away from the surface of the rapidly rotating recording surface 10. If it is desired to increase the loading of the head 12 and decrease the head to recording surface spacing, then the differential screw 36 would be backed off allowing the head support member 18 to pivot further before inclined surface 32 contacts nut 40. This will change the thickness of the hydrodynamic air film and the point of tangency of the head 12. After the point of tangency of the head 12 is adjusted, so that the gap between the surface of the head 12 and the recording surface 10 is at the point for optimum magnetic recording, the differential adjustment screw 36 is left in this position for repetitive movements of the members 18. The point of tangency for optimum magnetic recording, i.e. maximum signal output, will occur when the plane surface of the head is tangent to the periphery of the drum with the air gap therebetween at a minimum.

After the power is removed from the drive motor of recording surface 10, this also removes the power from the power source to the coil 30 and the bimetal cools and deflects back to a cold position pivoting the head support 18 back and moving the head 12 away from the surface of the drum, thus unloading the spring reed and lifting the magnetic head away from the drum before the hydrodynamic air film is destroyed from the loss of the drum speed.

While there have been shown and described and pointed out the fundamental novel features of the invention as applied to the disclosed preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. A magnetic head assembly of the type wherein a magnetic head is adapted to ride on a hydrodynamically created film of air adhering to the surface of a rapidly moving magnetic drum, the head assembly comprising; a magnetic head element, a pivotable head supporting member, a reed spring connecting the head to the head element and providing a loading force for the magnetic head element, a support housing journaling the head supporting member for pivotable movement, a bimetal motor operatively connected to the pivotable head supporting member for driving it in opposite directions to move the head from operative to inoperative positions, an electrical resistance element positioned adjacent the bimetal motor and adapted to be selectively energized to pivot the supporting member, a differentially threaded screw in said support housing, a nut on one end of the differentially threaded screw adapted to function as a limit stop, said nut being in the path of movement of the pivotable head support member to limit the movement thereof and accurately control the loading force which the head applies to the air film and the point of tangency of the head.

2. A magnetic head assembly of the type wherein a magnetic head is adapted to ride on a hydrodynamically created layer of air adhering to a rapidly moving magnetic drum the assembly comprising; a magnetic head element having a flat plane surface facing the drum, a pivotable head supporting member, a resilient single reed having one end rigidly connected to said head and rigidly connected to said supporting member adjacent the other end of the reed to provide a resilient arm for loading of the head on the hydrodynamically created layer of air, the reed in its unflexed condition extending at a slight angle to a tangent to the periphery of the drum, motor means operatively connected to said head supporting member for moving said head supporting member from a position with said head adjacent said drum to a position with said head away from said drum at any time the drum does not have sufficient speed to hydrodynamically create the layer of air on which the head rides, and adjustable screw means contacting and limiting the movement of the supporting member only when in the position with the head adjacent the drum to determine the amount of force applied by the amount of bending of the resilient single reed, said screw means being adjusted to a position to bias the head against the hydrodynamically created film of air and locating the plane surface of the head tangent to the periphery of the drum with the air gap therebetween at a minimum, thereby obtaining an air gap providing maximum signal output at the point of tangency between the head and a layer of air adhering to the drum surface.

References Cited by the Examiner

UNITED STATES PATENTS

| | | | |
|---|---|---|---|
| 2,862,781 | 12/58 | Baumeister | 179—100.2 |
| 2,913,536 | 11/59 | Fuller | 179—100.2 |
| 3,005,676 | 10/61 | Best et al. | 179—100.2 |
| 3,029,318 | 4/62 | Fay et al. | 179—100.2 |
| 3,091,669 | 5/63 | Frederick et al. | 179—100.2 |

IRVING L. SRAGOW, *Primary Examiner.*

DAVID G. REDINBAUGH, *Examiner.*